(12) United States Patent
Cadonau et al.

(10) Patent No.: US 7,866,971 B2
(45) Date of Patent: Jan. 11, 2011

(54) COUPLING FOR A PLASTICS INJECTION MOLDING MACHINE

(75) Inventors: Thomas Cadonau, Zuberwangen (CH); Max Waser, Hittnau (CH)

(73) Assignee: Kistler Holding AG, Winterthur (CH)

( * ) Notice: Subject to any disclaimer, the term of this patent is extended or adjusted under 35 U.S.C. 154(b) by 77 days.

(21) Appl. No.: 12/516,854

(22) PCT Filed: Dec. 12, 2007

(86) PCT No.: PCT/CH2007/000629
§ 371 (c)(1),
(2), (4) Date: May 29, 2009

(87) PCT Pub. No.: WO2008/074172
PCT Pub. Date: Jun. 26, 2008

(65) Prior Publication Data
US 2010/0062095 A1     Mar. 11, 2010

(30) Foreign Application Priority Data
Dec. 20, 2006   (CH) ..................................... 2071/06

(51) Int. Cl.
*B29C 45/77* (2006.01)
(52) U.S. Cl. ....................... 425/145; 264/40.1; 425/149
(58) Field of Classification Search ................ 425/145, 425/149; 264/40.1
See application file for complete search history.

(56) References Cited

U.S. PATENT DOCUMENTS

| | | | | |
|---|---|---|---|---|
| 5,352,394 A * | 10/1994 | Fujita et al. | ................. | 264/40.5 |
| 6,695,994 B2 * | 2/2004 | Bulgrin et al. | ............. | 264/40.1 |
| 6,814,558 B2 * | 11/2004 | Kubota et al. | ................ | 425/145 |
| 7,077,637 B2 * | 7/2006 | Hsu et al. | .................... | 425/145 |
| 2002/0160076 A1 * | 10/2002 | Kubota et al. | ................ | 425/574 |
| 2003/0062643 A1 * | 4/2003 | Bulgrin et al. | ............. | 264/40.1 |
| 2004/0071809 A1 * | 4/2004 | Hsu et al. | .................... | 425/150 |

FOREIGN PATENT DOCUMENTS

| EP | 0021249 | 1/1981 |
|---|---|---|
| JP | 2000117789 | 4/2000 |
| WO | WO 2005/002829 | 1/2005 |

OTHER PUBLICATIONS

English translation of International Preliminary Examination Report on Patentability, issued Jul. 7, 2009.

* cited by examiner

*Primary Examiner*—Tim Heitbrink
(74) *Attorney, Agent, or Firm*—Dority & Manning, P.A.

(57) ABSTRACT

A coupling for a plastics injection molding machine which connects a drive shaft to a screw comprises at least one force sensor with a measuring element for the indirect determination of the nozzle pressure. The coupling comprises a first connection which has torsional strength and does not transfer axial force. The coupling comprises a second connection, which is mechanically uncoupled from the first connection and is compression proof and does not transfer torque between the drive shaft and the feed screw. The measuring element is arranged in the force path A of the second compression proof connection but is not also in the force path T of the first connection. Thus, during operation, measurements in the measuring element are not falsified by torsional forces.

20 Claims, 3 Drawing Sheets

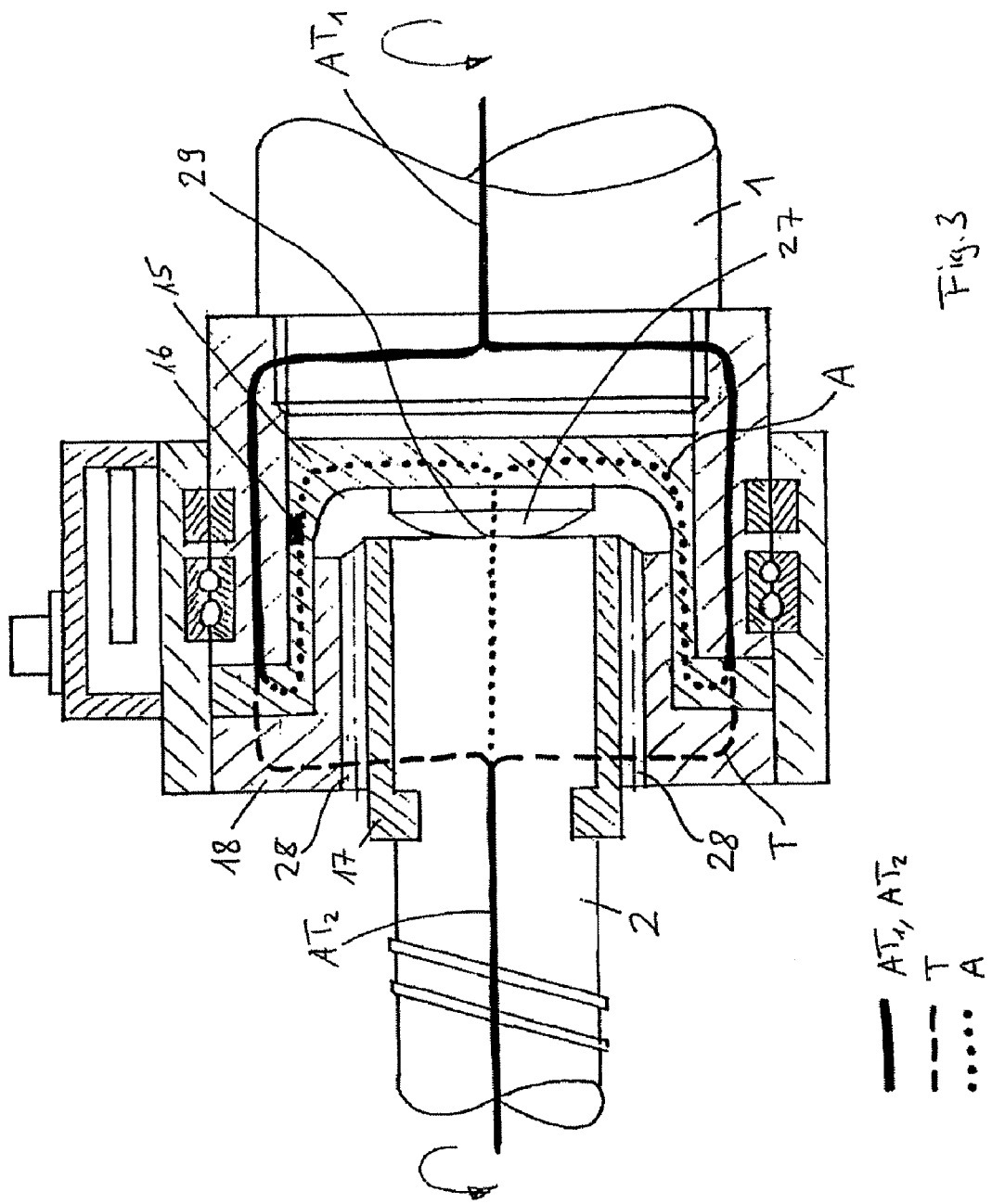

COUPLING FOR A PLASTICS INJECTION MOLDING MACHINE

CROSS-REFERENCE TO RELATED APPLICATIONS

This application claims priority to International Application Ser. No. PCT/CH2007/000629 filed Dec. 12, 2007, which claims priority to Swiss Application No. CH 2071/06 filed Dec. 20, 2006.

TECHNICAL AREA

The invention relates to a coupling for a plastics injection moulding machine, which connects a drive shaft to a screw in a torsion proof as well as a compression and tension proof manner, wherein the coupling at least comprises one force sensor for the indirect determination of the nozzle pressure.

BACKGROUND

Usually, injection moulding machines have a drive, which can set a drive shaft in rotational motion and also in translational motion via a linear feed. At this shaft, a screw is attached by means of a coupling which is connected to the shaft in a torsion proof as well as a compression and tension proof manner. By means of a nozzle, the screw provides the cavity with plastics which has been supplied to the screw, controlled by the movements of the shaft connected to the screw, in order to produce plastic parts. The control of said provision must be highly precise, so that the parts which are manufactured by this process satisfy quality requirements. The control considerably depends on the pressure in the pre chamber of the screw and/or in the nozzle, respectively.

With conventional electrical injection moulding machines said nozzle pressure is indirectly measured with a fixed force sensor at or in the transmission. For each application, in particular for each machine size, a different force sensor has to be used. This arrangement has the disadvantage that the force measurement is done remote from the place where the nozzle pressure actually appears. The measurement is falsified by friction forces occurring between the measuring arrangement and the nozzle pressure.

Another well-known method for measuring the nozzle pressure comprises a nozzle pressure sensor, which is directly attached at the nozzle. This direct measurement has an optimal arrangement, however, the measurement is problematic due to the direct contact of the sensor with the melt because thereby the sensor is exposed to the high temperatures of the melt and the sensor surface further experiences an intense mechanical abrasion by the constantly passing plastic melt.

In WO 2005/002829, an arrangement is provided in which a force sensor is disposed immediately behind a feed screw in a co-rotating manner. The advantage of this arrangement is a direct measurement close to the actually arising pressure. However, this arrangement has the disadvantage that the sensor in this assembly type in addition to the axial force also experiences a torsion which is transferred to the feed screw by means of the drive shaft, which leads to a falsified measurement.

OBJECTS AND SUMMARY OF THE PRESENT INVENTION

The object of the present invention is to provide a measuring arrangement for the determination of the nozzle pressure, by means of which the sensor is not directly exposed to the melt and which does not comprise systemic measurement errors.

The object is solved by a coupling for a plastics injection moulding machine of the type initially mentioned, wherein the coupling comprises a first connection with torsional strength which does not transfer axial force and a second connection mechanically uncoupled from the first connection which is compression proof and does not transmit any torque between the drive shaft and the feed screw, wherein a measuring element of the force sensor is arranged in the force path of the second compression proof connection. Thus, the measuring element is not exposed to a torsion force during a measurement, which would falsify the axial force measurement.

BRIEF DESCRIPTION OF THE DRAWINGS

In the following, the invention is explained in more detail with respect to the drawings, in which:

FIG. 3 is an illustration, such as FIG. 2, however, with force paths shown.

DETAILED DESCRIPTION OF EXEMPLARY EMBODIMENTS

Figure 1:
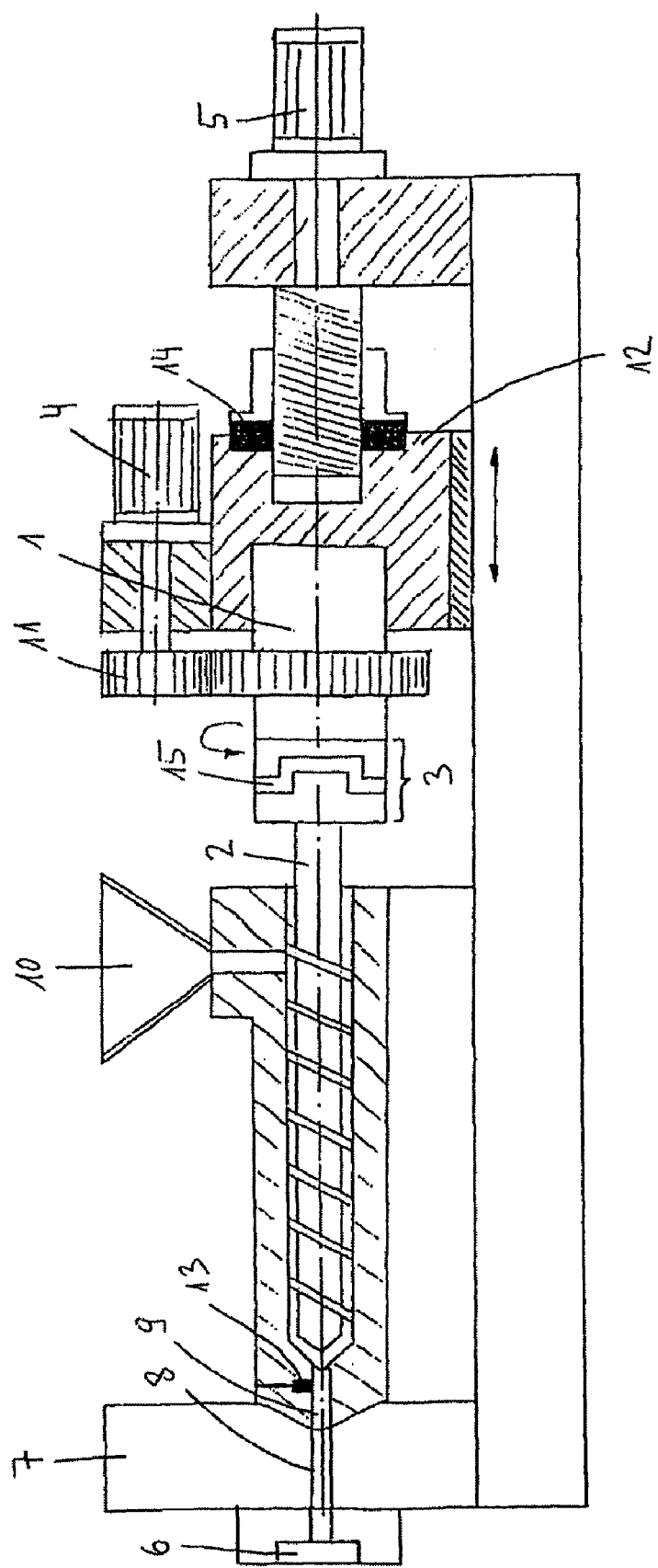
FIG. 1 is a schematic illustration in a sectional view of an injection moulding machine with measuring arrangements according to the prior art as well as with the measuring arrangement according to the present invention.

FIG. 1 shows a schematic illustration in a sectional view of an injection moulding machine. A cavity 6 behind a platen 7 is supplied with liquid plastic by a nozzle duct 8 via screw 2. In addition, screw 2 is provided with a supply unit 10 which ensures the supply of material. Said screw 2 feeds said material to its nozzle 9 by a rotating motion and it may additionally be controlled by a forward and return motion. In FIG. 1, a possible arrangement of engines 4, 5 is shown, which cause the necessary movements. Other arrangements are also possible.

In this illustration a first engine 4 is provided, which for example sets a drive shaft 1 in a rotating motion by means of a belt drive 11. In this arrangement, a second engine 5 causes a forward and return translation motion onto the same drive shaft 1 via a transmission 12, indicated by a double arrow underneath transmission 12. Said transmission 12 is appropriately supported in a sliding manner. The forces of the rotation and/or translation caused by the engines 4, 5 are transferred to screw 2 via a coupling 3, whereby the desired movement of screw 2 causes the filling of the cavity 6.

For the quality of the injection moulding parts a precise controlling of the plastics injection moulding machine is required, which depends on the nozzle pressure. In order to determine this pressure, different techniques are well-known for electrical injection moulding machines.

A first alternative for the determination of the nozzle pressure is the employment of a nozzle pressure sensor 13 in nozzle 9. Said nozzle pressure sensor 13 is directly exposed to the nozzle duct 8 and, thus, it is subject to high requirements, for example it must be heat-resistant and resistant against abrasion.

A second alternative of a measuring arrangement for the determination of the nozzle pressure is indicated in the same FIG. 1. In place of the nozzle pressure sensor 13, a force sensor 14 can be attached at or in the transmission 12. By means of force sensors the forces can be measured in a direct manner.

Of course, a measurement within this range has the advantage that the operating temperatures are low. On the other hand, the measurement is falsified by the far distance from the nozzle pressure, since with a translation movement the friction of transmission 12 on its basis takes up a part of the force to be measured. Additionally, the inertia of the equipment acting onto the sliding surface falsifies the measurement.

In place of the nozzle pressure sensor 13 and the force sensor 14, such as it is also illustrated in the same FIG. 1, a force sensor 15 for the force measurement can now be arranged in coupling 3. This arrangement according to the present invention has the advantage that the measurements are hardly falsified, since only smaller friction forces occur in the force flow between nozzle 9 and force sensor 15. Practically, the nozzle pressure acts onto force sensor 15 in an unbiased manner. However, since the measurement does not take place directly at the nozzle 9, the problems mentioned with respect to the nozzle pressure measurement, i. e. the high temperatures and the mechanical abrasion at the sensor surface, do not arise with this arrangement according to the present invention.

Figure 2:
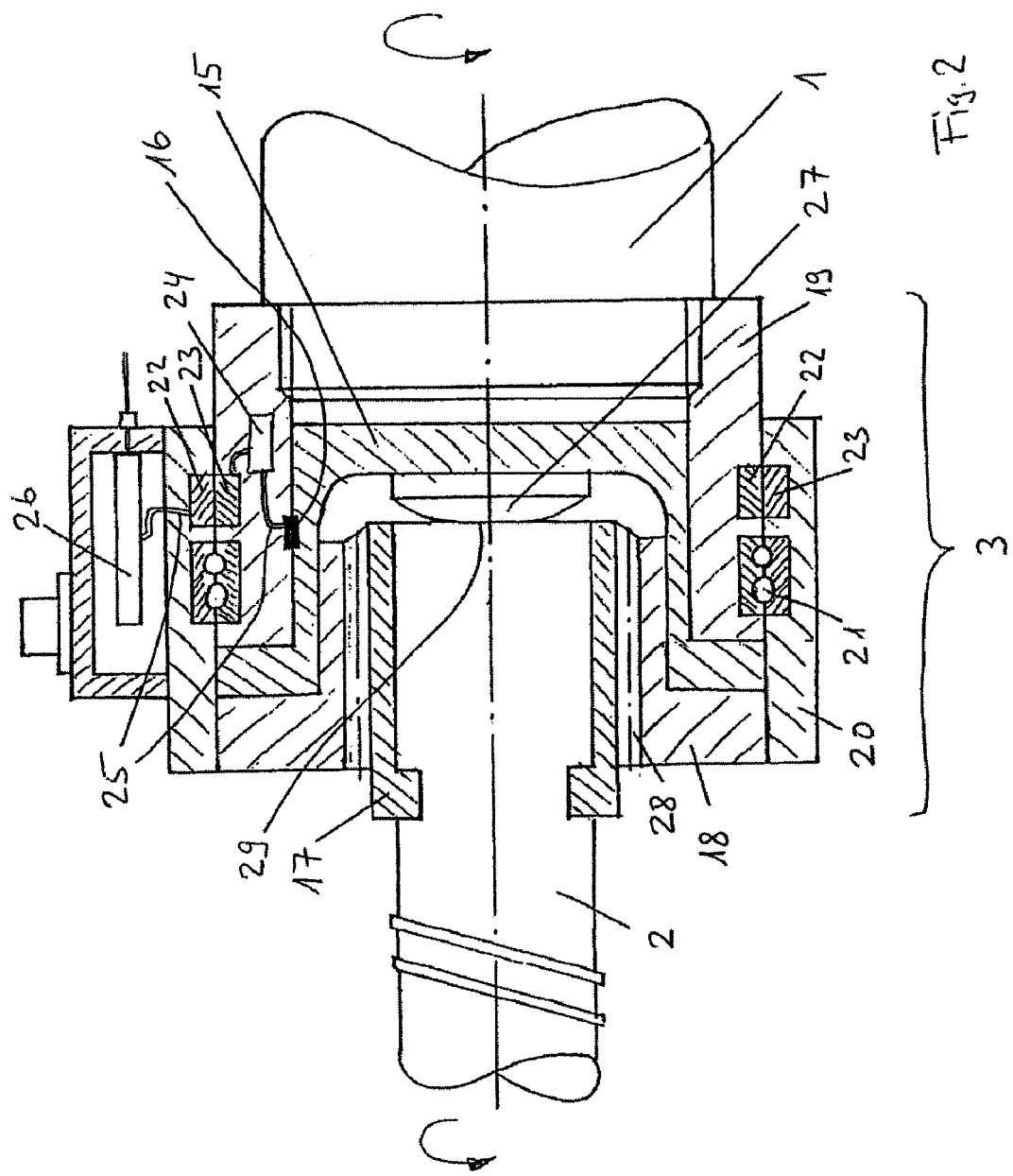
FIG. 2 is a schematic illustration in a sectional view of an injection moulding machine within the region of the coupling according to the present invention with the measuring arrangement according to the present invention.

In FIG. 2, the preferred arrangement according to the present invention is represented in more detail in the region of coupling 3. The reference symbols correspond to those of the first Figure. In this preferred embodiment, coupling 3 comprises an exchangeable adaptor 17, which exhibits a different internal diameter depending upon the screw size. Usual sizes are diameters of 20, 25, 30 and 35 mm. The adaptor 17 has to connect screw 2 with the remainder of coupling 3 in a torsion proof as well as a tension and compression proof manner. Naturally, with adaptor 17 also a fixed connection of feed screw 2 is possible.

According to the present invention, coupling 3 has a first torsion proof connection 28 to the adaptor 17 or to the feed screw 2 which does not transfer axial force. In FIGS. 2 and 3 said connection 28 for example is a longitudinal cogging between connection element 18 and adaptor 17. At this connection element 18, the drive shaft 1 is attached in the outer region via force sensor 15. Therefore, the force path of the torsion proceeds, as is shown in FIG. 3, along the continuous line $AT_1$ from drive shaft 1 to force sensor 15 via the outer region, further along the dashed line T via connection element 18 and longitudinal cogging 28 as a torsion proof connection directly or via adaptor 17 to feed screw 2, and finally further along the continuous line $AT_2$.

Also according to the present invention, coupling 3 has a second compression proof connection 29 between drive shaft 1 and feed screw 2. Said compression proof connection 29 does not transfer any torque and is mechanically uncoupled from the first connection 28. In this embodiment said connection 29 preferably consists of a hardened plunger 27 between force sensor 15 and screw 2. Naturally, said connection can also be designed directly as a bearing 29 between force sensor 15 and feed screw 2. Said connection 29 is responsible for the force transmission from screw 2 to force sensor 15 and does not transfer any torsion. Therefore, the force path of the axial force proceeds, as is illustrated in FIG. 3, along the continuous line AT from drive shaft 1 to the outside region of force sensor 15, further along the scored line A directly via the internal region of force sensor 15 or via plunger 27 to feed screw 2, and finally further along the continuous line $AT_2$.

Force sensor 15 comprises a measuring element 16 for taking up the axial forces during a measurement. According to the present invention, said measuring element 16 is arranged in the part of force path A of the axial force, which is not situated also in the force path T of the torsion force. Thus, it is arranged in an uncoupled manner from the torsion. Thereby, it is ensured that no torsion forces affect the measuring element 16, which could falsify the measurement.

For example, measuring element 16 can be formed as strain gauges 16.

In place of said strain gauge 16 also every other suitable kind of a measuring element 16 can be used, which can determine the force caused by the nozzle pressure onto coupling 3. The use of a cylinder load cell or of a diaphragm load cell as a measuring element 16, e. g. which is centrally arranged within the region of the plunger, is also very suitable.

In this embodiment, a flange 19 is attached at the back side of force sensor 15, said flange being attached by means of ball bearings 21 at a stator housing 20, whereby a rotation of coupling 3 is rendered possible. Now, said flange 19 is connected with drive shaft 1, which in operation may be set in a rotating motion and in a translation by engines 4, 5, such as it is described in FIG. 1.

Thus, also the connections between connection element 18 and force sensor 15, between force sensor 15 and flange 19 and between flange 19 and drive shaft 1 have to be torsion proof and also compression proof, preferably also tension proof.

In coupling 3, for example in flange 19, a preamplifier 24 can now be attached, which is connected with strain gauge 16 via measurement lines 25 on the one hand and with a first coil 22 on the other hand. Said first coil 22 is arranged directly opposite of a second coil 23, which is attached at the stator housing 20. Thus, the pre-amplified measuring data can be transmitted from the first coil 22 to the second coil 23 via telemetry. From this second coil 23, the measuring data can be transferred in a conventional manner to an amplifier 26 via a further measuring line 25 and finally to a plotting device or to a machine control, wherein the amplifier 26 can be attached in or at the stator housing 20.

Other kinds of wireless transmission of the measuring data from the rotatable coupling 3 to a plotting device are also possible.

LIST OF REFERENCE SYMBOLS 1 drive shaft, shaft
2 screw, feed screw
3 coupling
4 engine for rotation
5 engine for translation (feed motion/return)
6 cavity
7 platen
8 nozzle duct
9 nozzle
10 supply unit
11 belt drive
12 transmission
13 nozzle pressure sensor
14 force sensor
15 force sensor (arrangement according to the present invention)
16 measuring element, strain gauge
17 adaptor
18 connection element
19 flange
20 stator housing
21 ball bearing 22 first coil
23 second coil
24 preamplifier
25 lines, measuring lines
26 amplifier
27 plunger
28 torsion proof connection, longitudinal cogging
29 compression proof connection, axial support
AT common force path of torsion force and axial force
A force path of axial force, which is not also force path of the torsion force
T force path of the torsion force, which is not also force path of the axial force

The invention claimed is:

1. A coupling for a plastics injection moulding machine, which connects a drive shaft with a feed screw, the coupling comprises one force sensor with a measuring element for the indirect determination of the nozzle pressure, a first connection which has torsional strength and does not transfer axial force, and a second connection mechanically uncoupled from the first connection and which is compression proof and does not transfer torque between said drive shaft and said feed screw, the measuring element being arranged in a force path A of the second compression proof connection while not being in a force path T of the first connection.

2. The coupling according to claim 1, wherein the force sensor includes at least one strain gauge.

3. The coupling according to claim 1, wherein screws of different sizes may be attached at the coupling.

4. The coupling according to claim 3, further comprising an exchangeable adaptor for the attachment of a screw having a desired diameter in a torsion proof as well as compression and tension proof manner.

5. The coupling according to claim 1, wherein the data measured by the force sensor can be transferred by telemetry.

6. The coupling according to claim 5, wherein the data can be transferred by a pair of coils facing each other, wherein one of said coils is attached at the coupling.

7. The coupling according to claim 1, wherein a preamplifier is attached in or at the coupling.

8. The coupling according to claim 1, further comprising a stator housing and an amplifier that is attached in or at the stator housing of the coupling.

9. The coupling according to claim 2, wherein screws of different sizes may be attached at the coupling.

10. The coupling according to claim 9, further comprising an exchangeable adaptor for the attachment of a screw having a desired diameter in a torsion proof as well as compression and tension proof manner.

11. The coupling according to claim 10, wherein the data measured by the force sensor can be transferred by telemetry.

12. The coupling according to claim 2, wherein the data measured by the force sensor can be transferred by telemetry.

13. The coupling according to claim 3, wherein the data measured by the force sensor can be transferred by telemetry.

14. The coupling according to claim 4, wherein the data measured by the force sensor can be transferred by telemetry.

15. The coupling according to claim 2, wherein a preamplifier is attached in or at the coupling.

16. The coupling according to claim 3, wherein a preamplifier is attached in or at the coupling.

17. The coupling according to claim 4, wherein a preamplifier is attached in or at the coupling.

18. The coupling according to claim 5, wherein a preamplifier is attached in or at the coupling.

19. The coupling according to claim 6, wherein a preamplifier is attached in or at the coupling.

20. The coupling according to claim 2, further comprising a stator housing and an amplifier that is attached in or at the stator housing of the coupling.

* * * * *